United States Patent [19]
Neeff et al.

[11] 3,753,644
[45] Aug. 21, 1973

[54] PROCESS FOR THE CONTINUOUS DYEING OF SYNTHETIC FIBRE MATERIALS

[75] Inventors: Rutger Neeff, Leverkusen; Robert Kuth, Cologne, both of Germany

[73] Assignee: Bayer Aktiengesellschaft, Leverkusen, Germany

[22] Filed: June 29, 1970

[21] Appl. No.: 50,937

[30] Foreign Application Priority Data
July 24, 1969 Germany.................. P 19 37 666.0

[52] U.S. Cl.............................. 8/25, 8/94, 8/176, 8/174
[51] Int. Cl.............................................. D06p 1/00
[58] Field of Search........................ 8/25, 162, 179; 260/397.7

[56] References Cited
UNITED STATES PATENTS

| | | | |
|---|---|---|---|
| 2,506,244 | 5/1950 | Kopp et al. | 260/397.7 UX |
| 3,537,811 | 11/1970 | Stingl | 260/397.7 R |
| 1,618,415 | 2/1927 | Ellis | 8/25 |
| 2,273,305 | 2/1942 | Whitehead | 8/25 |
| 2,921,945 | 1/1960 | Adams et al. | 280/397.7 |
| 2,977,376 | 5/1961 | Merian | 8/179 X |
| 3,215,485 | 11/1965 | Senn | 260/397.7 |
| 3,510,243 | 5/1970 | Seuret | 8/179 X |
| 3,549,311 | 12/1970 | Stingl | 8/179 X |

OTHER PUBLICATIONS
Wenkataraman, "The Chemistry of Synthetic Dyes" Vol. III, 1970 Pub. by Academic Press, N.Y.C. pages 447–449.

*Primary Examiner*—Donald Levy
*Attorney*—Plumley and Tyner

[57] ABSTRACT

Process for the continuous dyeing of synthetic fibre materials from organic solvents, characterised by impregnating the fibre materials with dye liquors which contain nitro dyestuffs of the formula

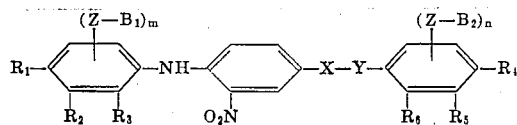

in which $R_1 - R_6$ represent, independently of one another, a hydrogen, fluorine, chlorine or bromine atom, a hydroxyl, alkoxy, alkoxy-carbonyloxy, alkylcarbonyloxy, arylcarbonyloxy, aroxycarbonyloxy, nitro, cyano, phenoxy, acylamino, aminocarbonyl, aminosulphonyl, acyl, alkoxycarbonyl, aroxycarbonyl or a trifluoromethyl group, X is a $-SO_2-$ or $-CO-$ group, Y is $-O-$ or $-NH-$, and Z is a single C—C bond or $-O-$, $m$ and $n$ are a number from 0 – 3, and $B_1$ and $B_2$ stand for a $C_1 - C_9$ alkyl, cycloalkyl or aralkyl radical, with the proviso that the sum total of the carbon atoms altogether contained in the substituent or substituents B amounts to at least 3 and at most 10, and that the sum total of $n$ and $m$ is at least 1, and subjecting the materials to a heat treatment.

The dyeings obtained are distinguished by a high dyestuff yield, very good texture as well as outstanding fastness properties, in particular, very good fastness to thermofixing, washing, rubbing and light.

11 Claims, No Drawings

PROCESS FOR THE CONTINUOUS DYEING OF SYNTHETIC FIBRE MATERIALS

The subject matter of the invention relates to the continuous dyeing of synthetic fiber materials from organic solvents; the process is characterised by impregnating the fibre materials with dye liquors which contain nitro dyestuffs of the formula

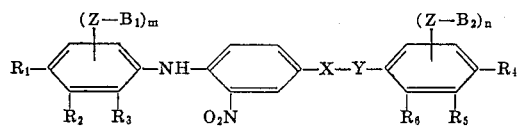

in which $R_1 - R_6$ represent, independently of one another, a hydrogen, fluorine, chlorine or bromine atom, a hydroxyl, alkoxy, alkoxycarbonyloxy, alkylcarbonyloxy, arylcarbonyloxy, aroxycarbonyloxy, nitro, cyano, phenoxy, acylamino, aminocarbonyl, aminosulphonyl, acyl, alkoxycarbonyl, aroxycarbonyl or a trifluoromethyl group, X is a $-SO_2-$ or $-CO-$ group, Y is $-O-$ or $-NH-$, and Z represents a single C—C bond or $-O-$, $m$ and $n$ are a number from 0 – 3, and $B_1$ and $B_2$ stand for a $C_1 - C_9$ alkyl, cycloalkyl or aralkyl radical, with the proviso that the sum total of the carbon atoms altogether contained in the substituent or the substituents B amounts to at least 3 and at most 10, and that the sum total of $n$ and $m$ is at least 1 and subjecting the thus treated material to a heat treatment.

Preferred alkoxy, alkylcarbonyloxy, alkoxycarbonyloxy and alkoxycarbonyl groups are those the alkyl radicals of which contain 1 – 6 carbon radicals; preferred arylcarbonyloxy, aroxycarbonyloxy or aroxycarbonyl groups contain as aryl group the phenyl radical which may be substituted by halogen atoms or lower alkyoxy groups.

Suitable acyl radicals are those of the formulae $R_7-CO-$ or $R_8-SO_2-$, the radicals $R_7$ and $R_8$ representing hydrocarbon radicals, preferably alkyl radicals or phenyl radicals which may carry water-insolubilizing substituents, and/or may contain hetero atoms.

For B there may be mentioned by way of example: as $C_1 - C_9$ alkyl radicals the methyl, ethyl, propyl, isopropyl, iso-butyl, sec.-butyl, tert.-butyl, iso-amyl, sec.-pentyl, neopentyl, methyl-pentyl, dimethyl-butyl, methyl-hexyl, dimethyl-pentyl, trimethyl-butyl, iso-octyl, methyl-heptyl, dimethyl-hexyl, trimethyl-pentyl, tetramethyl-butyl, iso-nonyl, dimethyl-heptyl and the trimethyl-hexyl radical;

as cycloalkyl radicals the cyclohexyl and the methyl-cyclohexyl radical, and as aralkyl radicals, in particular, the $\alpha, \alpha$-dimethyl-benzyl radical.

The dyestuffs used for the dyeing from organic solvents according to the invention are obtained by known methods, e.g. by reacting 4-chloro-3-nitrobenzene-sulphonic acid or -carboxylic acid halides with aminoaryl compounds and condensing the resulting 4-chloro-3-nitro-benzene-sulphonic acid or -carboxylic acid aryl amides with the same or different aminoaryl compounds, or by reacting, in the presence of inorganic or organic bases, 4-arylamino-3-nitro-benzene-sulphonic acid or -carboxylic acid halides with hydroxyaryl compounds, the amino- and hydroxy-aryl compounds carrying one or more 1 – 9 carbon atom-containing alkyl, cycloalkyl or aralkyl radicals.

Organic solvents suitable for the process according to the invention are those solvents which are immiscible with water and the boiling points of which range from 40° to 150°C, e.g. aromatic hydrocarbons, such as toluene or xylene; aromatic halogenated hydrocarbons, such as chlorobenzene and dichlorobenzene; aliphatic halogenated hydrocarbons, especially chlorinated hydrocarbons, such as methylene chloride, chloroform, carbon tetrachloride, dichloroethane, trichloroethane, tetrachloroethane, dichloropropane, chlorobutane, and dichlorobutane.

Tetrachloroethylene, trichloroethylene, 1,1,1-trichloroethane and 1,1,1-trichloropropane have proved to be particularly suitable.

The synthetic fiber materials to be dyed by the process according to the invention are primarily fibre materials of polyesters, e.g. polyethylene terephthalates or polyesters obtained from 1,4-bis-(hydroxymethyl)-cyclohexane and terephthalic acid, from cellulose triacetate, from synthetic polyamides, such as poly-ε-caprolactam, polyhexamethylene-diamine adipate or polyω-amino-undecanic acid, from polyurethanes, or from polyolefins. The fibre materials may be present in the form of woven or knitted fabrics.

The dyestuffs to be used for dyeing according to the invention are dissolved in the water-immiscible, organic solvents, or they are added to the latter in the form of solutions in solvents which can be mixed with these solvents to an unlimited extent, such as alcohols, dimethyl formamide, dimethyl acetamide, dimethyl sulphoxide or sulpholan, and the synthetic fibre materials are impregnated with the clear dyestuff solutions obtained which may also contain, for improving the levelness of the dyeings, soluble, non-ionic auxiliaries, e.g. the known surface-active ethoxylated and propoxylated products of fatty alcohols, alkylphenols, fatty acid amides and fatty acids. The dyestuffs are subsequently fixed on the fibre materials by a heat treatment. The heat treatment may consist in a brief dry-heat treatment at 120°– 230°C, the dry-heat treatment optionally being preceded by an intermediate drying or, alternatively, in a treatment of the fibre materials in a superheated solvent vapour at 100° – 150°C. Small non-fixed portions of the dyestuff can be washed out by a brief treatment with the cold organic solvent. It may be mentioned that in some cases mixtures of the dyestuffs to be used according to the invention result in a better dye yield than the individual dyestuffs and may have a better solubility in the organic solvent.

With the aid of the process according to the invention it is possible to obtain on synthetic fiber materials, when dyeing from organic solvents, dyeings which are distinguished by a high dyestuff yield, very good texture as well as outstanding fastness properties, in particular, very good fastness to thermofixing, washing, rubbing and light. Another advantage of the dyestuffs to be used according to the invention is their ready solubility in organic solvents, especially in tetrachloroethylene, trichloroethylene, 1,1,1-trichloroethane and 1,1,1-trichloropropane, this enabling the dyeing to be carried out without the use of solutes.

EXAMPLE 1

A fabric of polyethylene terephthalate fibers is impregnated at room temperature with a clear yellow solution which contains 10 parts 4-(4-isobutylanilino)-3-nitro-benzene-sulphonic acid-(4-isobutylanilide) in
990 parts tetrachloroethylene.

After squeezing the fabric to a weight increase of 60 percent, it is dried at 60°C for 1 minute. The dyestuff is subsequently fixed by heating the fabric at 190° – 220°C for 45 seconds. The small amount of non-fixed dyestuff is subsequently washed out by a brief treatment for 20 seconds in cold tetrachloroethylene. After drying, a clear yellow dyeing is obtained which is distinguished by its high dyestuff yield, very good texture as well as by outstanding fastness properties, particularly very good fastness to thermofixing, washing, rubbing and light.

In an analogous manner equivalent clear yellow dyeings were obtained on fabrics of
a. cellulose triacetate,
b. synthetic polyamides or polyurethanes, and
c. polypropylene fibres;
but the thermofixing was carried out
for a. at 200° – 220°C,
for b. at 170° – 200°C,
and
for c. at 120° – 150°C.

Equivalent dyeings were also obtained by replacing the 990 parts tetrachloroethylene by the same amount of one of the following solvents: methylene chloride, chloroform, carbon tetrachloride, dichloroethane, trichloroethane, trichloroethylene, tetrachloroethane, dichloropropane, 1,1,1-trichloropropane, chlorobutane and dichlorobutane.

The dyestuff used can be produced, for example, as follows:

Thirty parts 4-isobutylaniline in 25 parts glycol monoethyl ether are mixed at room temperature with 12.8 parts 4-chloro-3-nitro-benzene-sulphonic acid chloride. The mixture is heated to boiling until the formation of the dyestuff is completed. After cooling, the melt is introduced into a mixture of ice and hydrochloric acid, the precipitate is filtered off with suction, washed with water and air-dried. The dyestuff yield is virtually quantitative.

EXAMPLE 2

A knitted fabric of polyhexamethylene-diamine adipate filaments is impregnated at room temperature with a clear yellow solution which contains 5 parts 4-anilino-3-nitro-benzene-sulphonic acid-(4-tert.-butylanilide),
5 parts 4-(4-tert.-butylanilino)-3-nitro-benzene-sulphonic acid anilide,
7 parts of the condensation product of 1 mol nonylphenol and 7 mol ethylene oxide in
983 parts tetrachloroethylene.

After squeezing the knitted fabric to a weight increase of 60 percent, it is dried at 80°C for 1 minute. The dyestuff is subsequently fixed by heating the knitted fabric at 192°C for 45 seconds. Small non-fixed dyestuff portions are then rinsed by a brief treatment for about 20 seconds in cold tetrachloroethylene. After drying, a clear yellow dyeing is obtained which is distinguished by its very high dyestuff yield, very good texture as well as by outstanding fastness properties, particularly very good fastness to thermofixing, washing, rubbing and light.

An equivalent dyeing was also obtained by replacing the 983 parts tetrachloroethylene by the same amount of toluene, xylene, chlorobenzene or dichlorobenzene.

The dyestuffs used can be prepared, for example, in an analogous manner to that described in Example 1 by first reacting 3-nitro-4-chloro-benzene-sulphonic acid chloride at room temperature with 4-tert.-butylaniline or aniline, followed by condensing the resultant 3-nitro-4-chloro-benzene-sulphonic acid-(4-tert.butylanilide) or -anilide with aniline or 4-tert.-butylaniline.

EXAMPLE 3

A fabric of polypropylene fibres is impregnated at room temperature with a clear yellow solution which contains 10 parts 4-anilino-3-nitro-benzene-sulphonic acid-(2,3- or -4-isooctylanilide),
7 parts of the condensation product of 1 mol nonylphenol and 7 mol ethylene oxide in
983 parts tetrachloroethylene.

After squeezing the fabric to a weight increase of 60 percent, it is dried at 80°C for 1 minute. The dyestuff is subsequently fixed by heating the fabric at 140°C for 30 seconds. The non-fixed dyestuff portions can be washed out by a brief treatment in cold solvent. A clear yellow dyeing is obtained which is distinguished by a high dyestuff yield, very good texture and outstanding fastness properties, especially very good fastness to thermofixing, washing, rubbing and light.

EXAMPLE 4

A fabric of poly-1,4-cyclohexane-dimethylene terephthalate is impregnated at room temperature with a clear yellow solution which contains 10 parts 4-(4-tert.-butylanilino)-3-nitro-benzoic acid-(4-tert.-butylanilide) and
7 parts of the condensation product of 1 mol nonylphenol and 7 mol ethylene oxide in
983 parts tetrachloroethylene.

After squeezing the fabric to a weight increase of 60 percent, it is dried at λ°C for 1 minute. The dyestuff is subsequently fixed by heating the fabric at 190° – 220°C for 45 seconds. The small amount of non-fixed dyestuff is washed out by a brief treatment for 20 seconds in cold tetrachloroethylene. After drying, a clear yellow dyeing is obtained which is distinguished by its high dyestuff yield, very good texture as well as outstanding fastness properties, especially very good fastness to thermofixing, washing, rubbing and light.

The dyestuff used was prepared, for example, as follows:

Eleven parts 4-chloro-3-nitro-benzoylchloride are introduced at 20° – 25°C into 40 parts 4-tert.-butylaniline. The mixture is heated at 140° – 145°C until the dyestuff formation is completed. It is cooled to 80°C, diluted with 30 parts methanol, introduced into a mixture of hydrochloric acid and ice, the precipitate is filtered off with suction, washed with water and dried. The dyestuff is obtained in almost quantitative yield in the form of orange-coloured prisms.

EXAMPLE 5

A fabric of polyethylene terephthalate fibres is impregnated at room temperature with a clear yellow solution which contains 10 parts 4-anilino-3-nitro-benzene-sulphonic acid-(4-isooctylphenyl ester), 7 parts of the condensation product of 1 mol nonylphenol and 7 mol ethylene oxide in 983 parts tetrachloroethylene.

After squeezing the fabric to a weight increase of 60 percent, it is dried at 80°C for 1 minute. The dyestuff is subsequently fixed by heating the fabric at 190° – 220°C for 45 seconds. The small, non-fixed amount of dyestuff is washed out with cold tetrachloroethylene. After drying, a clear yellow dyeing is obtained which is distinguished by its high dyestuff yield, very good texture as well as by outstanding fastness properties, especially very good fastness to thermofixing, washing, rubbing and light.

The dyestuff used can be prepared, for example, as follows: 15.6 parts 4-anilino-3-nitro-benzene-sulphonic acid chloride are introduced at 20° – 25°C into a mixture of 40 parts glycol monomethyl ether and 12.5 parts sodium 4-isooctylphenolate. The resulting mixture is heated to 100° – 110°C until the dyestuff formation is completed. After cooling, the melt is poured on to ice, the precipitated dyestuff is filtered off with suction and dried in a vacuum. The yield is almost quantitative.

EXAMPLE 6

A fabric of polyethylene terephthalate fibers is impregnated at room temperature with a clear yellow solution which contains 10 parts 4-anilino-3-nitro-benzoic-sulphonic acid-(4-isooctylphenyl ester) in 990 parts 1,1,1-trichloroethane.

After squeezing the fabric to a weight increase of 60 percent, the dyestuff is fixed by treating the fabric for 45 seconds with superheated 1,1,1-trichloroethane vapour at 140°C. The small amount of non-fixed dyestuff is washed out by brief rinsing in cold 1,1,1-trichloroethane. After drying, a clear yellow dyeing is obtained which is distinguished by its high dyestuff yield, very good texture and outstanding fastness properties.

The dyestuff used can be prepared, for example, as follows:

13.8 parts 4-anilino-3-nitro-benzoylchloride are introduced at 20° – 25°C into a suspension of 12.5 parts sodium 4-iso-octylphenolate in 75 parts benzene. The mixture is heated to boiling until the dyestuff formation is completed. The benzene is distilled off in a vacuum, the residue taken up in dimethyl formamide, poured on to ice, the precipitated dyestuff is filtered off with suction, washed with water and dried in a vacuum. The yield is almost quantitative.

EXAMPLE 7

A fabric of poly-1,4-cyclohexane-dimethylene terephthalate is impregnated at room temperature with a clear yellow solution which contains 10 parts 4-(4-tert.-butylanilino)-3-nitro-benzene-sulphonic acid-(4-tert.-butylphenyl ester) in 990 parts tetrachloroethylene.

After squeezing the fabric to a weight increase of 60 percent, the dyestuff is fixed by treating the fabric for 35 seconds with superheated tetrachloroethylene vapour at 150°C. The small non-fixed dyestuff amount is then washed out by brief rinsing in cold tetrachloroethylene. After drying, a clear yellow dyeing is obtained which is distinguished by its high dyestuff yield, very good texture as well as by outstanding fastness properties.

The dyestuff used can be prepared as described in Example 5.

Clear yellow dyeings on fabrics of polyester, triacetate, polyamide, polyurethane and polyolefin fibres were also obtained with outstanding fastness properties when the afore-mentioned dyestuff was replaced by the same amount of one of the dyestuffs set out in the following Table:

Example/Dyestuff 8
 184-(3,4-dimethylanilino)-3-nitro-benzene-sulphonic acid (3,4-dimethylanilide)

9 4-anilino-3-nitro-benzene-sulphonic acid-(2,4,6-trimethylanilide)

10 4-(dimethylanilino)-3-nitro-benzene-sulphonic acid-(dimethylanilide)

11
 184-(4-tert.-butylanilino)-3-nitro-benzene-sulphonic acid-(4-cyclohexylanilide)

12
 184-(4-methoxyanilino)-3-nitro-benzene-sulphonic acid-(2,6-diethyl-4-methylanilide)

13 4-(3-ethoxyanilino)-3-nitro-benzene-sulphonic acid-(4-tert.-butylanilide)

14
 184-(2-methoxyanilino)-3-nitro-benzene-sulphonic acid-(4-tert.-butylanilide)

15 4-(3-fluoroanilino)-3-nitro-benzene-sulphonic acid-(4-isobutylanilide)

16 4-(4-chloroanilino)-3-nitro-benzene-sulphonic acid-(4-isobutylanilide)

17 4-(3-hydroxyanilino)-3-nitro-benzene-sulphonic acid-(2-, 3- or 4-isooctylanilide)

18
 184-(3-n-butylcarbonyloxyanilino)-3-nitro-benzene-sulphonic acid-(2-methyl-4-n-butylanilide)

19
 184-(2,4-dimethoxyanilino)-3-nitro-benzene-sulphonic acid-(4-isobutylanilide)

20 4-(4-bromoanilino)-3-nitro-benzene-sulphonic acid-(3-isoamyloxyanilide)

21
 184-(3-methoxycarbonyloxyanilino)-3-nitro-benzene-sulphonic acid-(2-, 3- or 4-isooctylanilide)

22
 184-(3-phenylcarbonyloxyanilino)-3-nitro-benzene-sulphonic acid-(2-, 3- or 4-isooctylanilide)

23
 184-(3-phenoxycarbonyloxyanilino)-3-nitro-benzene-sulphonic acid-(2,3- or 4-isohexylanilide)

24 4-(3-nitroanilino)-3-nitro-benzene-sulphonic acid-(3-isoamyloxyanilide)

25 4-(4-cyanoanilino)-3-nitro-benzene-sulphonic acid-(4-tert.-butylanilide)

26
 184-(4-phenoxyanilino)-3-nitro-benzene-sulphonic acid-(2-, 3- or 4-isooctylanilide)

27
184-(3-n-butylaminocarbonylanilino)-3-nitro-benzene-sulphonic acid-(4-isopropylanilide)
28 4-(4-ethoxyanilino)-3-nitro-benzene-sulphonic acid-(4-isobutylanilide)
29 4-(2-, 3- or 4-isooctylanilino)-3-nitro-benzene-sulphonic acid-(4-methylsulphonylanilide)
30
184-(4-diethylaminosulphonylanilino)-3-nitro-benzene-sulphonic acid-(2-, 3- or 4-isooctylanilide)
31
184-(4-acetylaminoanilino)-3-nitro-benzene-sulphonic acid-(2,3- or 4-isohexylanilino)
32
184-(4-⅞-hydroxyethoxycarbonylanilino)-3-nitro-benzene-sulphonic acid-(2-, 3- or 4-isooctylanilide)
33
184-(3trifluoromethylanilino)-3-nitro-benzene-sulphonic acid-(44-isobutylanilide)
34
184-(4p-tert.butylphenyloxycarbonylanilino)-3-nitro-benzene-sulphonicacid-(4-tert.-butylanilide)
35 4-(2-chloroanilino)-3-nitro-benzene-sulphonic acid-(4-tert.-butylanilide)
36
184-(4-tert.-butylanilino)-3-nitro-benzene-sulphonic acid-(2-bromoanilide)
37 4-(4-isobutylanilino)-3-nitro-benzene-sulphonic acid-(3-nitroanilide)
38
184-(4-tert.-butylanilino)-3-nitro-benzene-sulphonic acid-(3-2'-ethylhexyloxycarbonylanilide)
39
184-(4-n-butoxyanilino)-3-nitro-benzene-sulphonic acid-(4-diethylacetoxyanilide)
40
184-(3-isoamyloxyanilino)-3-nitro-benzene-sulphonic acid-(3-methylsulphonylaminoanilide)
41
184-(3-isopropylamino)-3-nitro-benzene-sulphonic acid-(4-diethylacetaminoanilide)
42
184-(4-β-cyanoethoxycarbonylanilino)-3-nitro-benzene-sulphonic acid-(2-, 3- or 4-isooctylanilide)
43 4-(4-isobutylanilino)-3-nitro-benzene-sulphonic acid-(3-isobutylaminosulphonylanilide)
44
184-(3-isobutoxyanilino)-3-nitro-benzene-sulphonic acid-(3-isobutoxyanilide)
45
184-(3-n-butoxyanilino)-3-nitro-benzene-sulphonic acid-(4-isobutoxyanilide)
46
184-(2,4-dimethoxyanilino)-3-nitro-benzene-sulphonic acid-(4-isoamyloxyanilide)
47
184-(2,5-dimethoxyanilino)-3-nitro-benzene-sulphonic acid-(3-isoamyloxyanilide)
48
184-(2,5-diethoxyanilino)-3-nitro-benzene-sulphonic acid-(3-isobutoxyanilide)
49 4-(4-isobutylanilino)-3-nitro-benzoic acid-(4-isobutylanilide)
50 4-(4-methylanilino)-3-nitro-benzoic acid-(4-isobutylanilide)
51 4-(3,4-dimethylanilino)-3-nitro-benzoic acid-(2,4,6-trimethylanilide)
52 4-(4-tert.-butylanilino)-3-nitro-benzoic acid-(2-methyl-4-cyclohexylanilide)
53 4-(4-n-butoxyanilino)- 3-nitro-benzoic acid-(2,3- or 4-isohexylanilide)
54 4-(3-ethoxyanilino)-3-nitro-benzoic acid-(4-tert.-butylanilide)
55 4-(2-methoxyanilino)-3-nitro-benzoic acid-(4-tert.-butylanilide
56 4-(4-fluoroanilino)-3-nitro-benzoic acid-(2-, 3- or 4-isooctylanilide)
57 4-(3-isoamyloxyanilino)-3-nitro-benzoic acid-(2-chloroanilide)
58 4-(3-hydroxyanilino)-3-nitro-benzoic acid-(2-, 3- or 4-isohexylanilide)
59
184-(4-2'-ethylhexyloxycarbonylanilino)-3-nitrobenzoic acid-(2,4,6-trimethylanilide)
60 4-(2,4-dimethoxyanilino)-3-nitro-benzoic acid-(4-isobutylanilide)
61 4-(2,5-dimethoxyanilino)-3-nitro-benzoic acid-(4-isobutylanilide)
62 4-(2,5-diethoxyanilino)-3-nitro-benzoic acid-(4-tert.-butylanilide)
63
184-(4-methoxycarbonyloxyanilino)-3-nitro-benzoic acid-(2,3- or 4-isooctylanilide)
64
184-(4-phenoxycarbonyloxyanilino)-3-nitro-benzoic acid-(2-, 3- or 4-isooctylanilide)
65 4-(4-nitroanilino)-3-nitro-benzoic acid-(2-, 3- or 4-isohexylanilide)
66 4-(3-cyanoanilino)-3-nitro-benzoic acid-(2-, 3- or 4-isooctylanilide)
67 4-(2-, 3- or 4-isohexylanilino)-3-nitro-benzoic-acid-(4-phenoxyanilide)
68 4-(isovaleroylaminoanilino)-3-nitro-benzoic acid-(4-tert.-butylanilide)
69 4-(4-propylcarbonylanilino)-3-nitro-benzoic acid-(4-tert.-butylanilide)
70 4-(4-methylsulphonylanilino)-3-nitro-benzoic acid-(2-, 3- or 4-isooctylanilide)
71
184-(3-dipropylaminosulphonylanilino)-3-nitro-benzoic acid-(4-tert.-butylanilide)
72
184-[3-di-(β-hydroxyethyl)-aminocarbonylanilino]-3-nitro-benzoic acid-(2-, 3- or 4-isohexylanilide)
73
184-(4-β-cyanoethoxycarbonylanilino)-3-nitro-benzoic acid-(2-, 3- or 4-isooctylanilide)
74
184-(4-p-tert.-butylphenoxycarbonylanilino)-3-nitro-benzoic acid-(4-isobutylanilide)
75
184-[3,5-di-(trifluoromethyl)-anilino]-3-nitro-benzoic acid-(3-isoamyloxyanilide)
76 4-(2-chloroanilino)-3-nitro-benzoic acid-(3-isobutoxyanilide)
77 4-(4-tert.-butylanilino)-3-nitro-benzoic acid-(4-isobutoxyanilide)
78 4-(2,3- or 4-isohexylanilino)-3-nitro-benzoic acid-(3-nitroanilide)

79  4-(4-tert.-butylanilino)-3-nitro-benzoic acid-(4-isobutoxycarbonylanilide)
80  4-(2,5-diethoxyanilino)-3-nitro-benzoic acid-(3-trimethylacetoxyanilide)
81
184-(4-isoamyloxyanilino)-3-nitro-benzoic-acid-(4-methylsulphonylaminoanilide)
82  4-(4-tert.-butylanilino)-3-nitro-benzoic acid-(3-diethylacetaminoanilide)
83  4-(4-tert.-butylanilino)-3-nitro-benzoic acid-[4-(2'-ethylhexylaminosulphonyl)-anilide]
85  4-(2-methoxyanilino)-3-nitro-benzoic acid-(3-isoamyloxyanilide)
85  4-(4-n-butoxyanilino)-3-nitro-benzoic acid-(4-n-butoxyanilide)
86  4-(2,4-diethoxyanilino)-3-nitro-benzoic acid-(4-iso-butoxyanilide)
87  4-(2,5-diethoxyanilino)-3-nitro-benzoic acid-(3-isobutoxyanilide)
88  4-(2,5-diethoxyanilino)-3-nitro-benzoic acid-[4-(2'-ethylhexylaminocarbonyl)-anilide]
89  4-(4-tert.-butylanilino)-3-nitro-benzoic acid-(4-isobutylaminocarbonylanilide)
90
184-(4-tert.-butylanilino)-3-nitro-benzene-sulphonic acid-(4-tert.-butylphenyl ester)
91
184-(2-methoxyanilino)-3-nitro-benzene-sulphonic acid-(4-isooctylphenyl ester)
92  4-(3-ethoxyanilino)-3-nitro-benzene-sulphonic acid-(2,6-diisopropylphenyl ester)
93
184-(4-methoxycarbonylanilino)-3-nitro-benzene-sulphonic acid-(2,6-di-tert.-butylphenyl ester)
94
184-(3-acetaminoanilino)-3-nitro-benzene-sulphonic acid-(4-isononylphenyl ester)
95  4-(4-chloroanilino)-3-nitro-benzene-sulphonic acid-(4-methyl-2,6-di-tert.-butylphenyl ester)
96
184-(2,4-diethoxyanilino)-3-nitro-benzene-sulphonic acid-(4-tert.-butylphenyl ester)
97  4-(4-tert.-butylanilino)-3-nitro-benzosulphonic acid-(2,4-dimethylphenyl ester)
98  4-(2,3- or 4-isooctylanilino)-3-nitro-benzosulphonic acid-(4-methylphenyl ester)
99  4-(3-isoamyloxyanilino)-3-nitro-benzosulphonic acid-phenyl ester
100  4-anilino-3-nitro-benzene-sulphonic acid-[4-(2-phenyl-propyl-(2))-phenyl ester]
101  4-anilino-3-nitro-benzoic acid-(4-isooctylphenyl ester)
102  4-(4-isopropylanilino)-3-nitro-benzoic acid-(4-phenyl-methylphenyl ester)
103  4-(3-methoxyanilino)-3-nitro-benzoic acid-[4-(2-phenyl-propyl-(2))-phenyl ester]
104  4-(2,5-dimethoxyanilino)-3-nitro-benzoic acid-(4-tert.-butylphenyl ester)
105  4-(3-cyanoanilino)-3-nitro-benzoic acid-(4-isooctyl-phenyl ester)
106  4-(3-isoamyloxyanilino)-3-nitro-benzoic acid-phenyl ester
107  4-(tert.-butylanilino)-3-nitro-benzoic acid-[4-(2-ethylbutoxycarbonyl)-phenyl ester]
108  4-(4-isobutylaminocarbonyl)-3-nitro-benzoic acid-(4-tert.-butylphenyl ester)
109  4-(4-isobutylanilino)-3-nitro-benzoic acid-(2,6-di-tert.-butylphenyl ester)
110  4-(3-methoxycarbonylanilino)-3-nitro-benzoic acid-(4-isooctylphenyl ester)

EXAMPLE 111

A fabric of cellulose triacetate fibers is impregnated at room temperature with a clear yellow solution which contains 10 parts of a dyestuff mixture which was prepared by condensation of 1 equivalent 3-nitro-4-chlorobenzene-sulphonic acid chloride with a mixture of 1 equivalent aniline (amine I) and 1 equivalent 4-tert.-butyaniline (amine II) produced in the manner described below, and 983 parts tetrachloroethylene.

After squeezing the fabric to a weight increase of 60 percent, it is dried at 80°C for 1 minute. The dyestuff is subsequently fixed by heating the fabric at 215°C for 1 minute. A clear yellow dyeing is obtained which is distinguished by a high dyestuff yield, very good texture and outstanding fastness properties, especially very good fastness to thermofixing, washing, rubbing and light.

The dyestuff mixture used was prepared as follows:

Fifteen parts 4-tert.-butylaniline and 9.3 parts aniline were mixed in 25 parts glycol monomethyl ether at 20° – 25°C with 12.8 parts 4-chloro-3-nitrobenzene-sulphonic acid chloride. The mixture was heated at 120° – 125°C until the dyestuff formation was completed. After cooling, the melt was introduced into a mixture of ice and hydrochloric acid and the precipitate filtered off with suction, washed with water and air-dried. The dyestuff mixture is a yellow powder.

Clear yellow dyeings with equivalent fastness properties were likewise obtained on fabrics of polyester, triacetate, polyamide, polyurethane and polyolefin fibres when the dyestuff mixture described above was replaced by the same amount of one of the dyestuff mixtures as were obtained by reacting 1 equivalent 4-chloro-3-nitro-benzene-sulphonic acid chloride with a mixture of 1 equivalent each of one of the amines I and II set out in the Table below, according to Example 111.

| Example | Amine I | Amine II |
|---|---|---|
| 112 | 3,4-dimethyl-aniline | 4-isobutylaniline |
| 113 | 4-tert.-butylaniline | 4-cyclohexyl-aniline |
| 114 | 2-methoxy-aniline | 4-tert.-butylaniline |
| 115 | 3-methoxy-aniline | 3-isoamyloxy-aniline |
| 116 | 4-ethoxy-aniline | 4-isobutoxy-aniline |
| 117 | 3-chloro-aniline | 2,3- or 4-isooctylaniline (mixture) |
| 118 | 3-isobutoxycarbonyl-aniline | 4-n-butylaniline |
| 119 | 2,4-dimethoxy-aniline | 2-isopropylaniline |
| 120 | 2,5-dimethoxy-aniline | 4-isopropylaniline |
| 121 | 3-acetoxy-aniline | 2,3- or 4-isohexylaniline (mixture) |
| 122 | 3-cyano-aniline | 2-, 3- or 4-isooctylaniline (mixture) |
| 123 | 3-n-butylaminocarbonyl-aniline | 4-isobutylaniline |
| 124 | 3-diethylaminosulphonyl-aniline | 4-isoamyloxy-aniline |
| 125 | 4-n-butoxy-aniline | 4-diethylacetoxy-aniline |
| 126 | 4-methylsulphonylamino-aniline | 4-isobutoxyaniline |
| 127 | 3-isobutoxy-aniline | 4-isobutoxy-aniline |
| 128 | 2,4-dimethoxy-aniline | 3-isobutoxy-aniline |
| 129 | 2,5-diethoxy-aniline | 2-isobutoxy-aniline |
| 130 | 3-isobutylamino-sulphonyl-aniline | 4-tert.-butylaniline |

EXAMPLE 131

A fabric of polyethylene terephthalate fibres is impregnated at room temperature with a clear yellow solution which contains 10 parts of a dyestuff mixture obtained in the manner described below by condensation of 1 equivalent 3-nitro-4-chloro-benzoylchloride with a mixture of 1 equivalent aniline (amine I) and 1 equivalent 4-isobutylaniline (amine II), and 7 parts of the condensation product of 1 mol nonylphenol and 7 mol ethylene oxide in 983 parts tetrachloroethylene.

After squeezing the fabric to a weight increase of 60 percent, it is dried at 80°C for 1 minute and the dyetsuff fixed by heating the fabric at 190° – 220°C for 1 minute. A clear yellow dyeing is obtained which is distinguished by a high dyestuff yield, very good texture and outstanding fastness properties, especially very good fastness to thermofixing, washing, rubbing and light.

The dyestuff used was prepared as follows:

A solution of 15 parts 4-isobutylaniline and 9.3 parts aniline in 50 parts chlorobenzene is mixed at 20 – 25°C with 11 parts 4-chloro-3-nitro-benzoylchloride and heated to boiling until the dyestuff formation is completed. The chlorobenzene is then driven off with steam, the residue is taken up in dimethyl formamide, the solution poured on to ice and the dyestuff mixture is obtained, after suction-filtration, washing with water and drying, in the form of a yellow powder.

Clear yellow dyeings with equivalent fastness properties were likewise obtained on fabrics of polyester, triacetate, polyamide, polyurethane and polyolefin fibres when, instead of the dyestuff mixture described above, the same amount of one of the dyestuff mixtures was used as were obtained according to Example 131 by reacting 1 equivalent 4-chloro-3-nitro-benzoylchloride with a mixture of 1 equivalent each of the amines I and II set out in the following Table:

| Example | Amine I | Amine II |
|---|---|---|
| 132 | 4-tert.-butylaniline | 4-isobutylaniline |
| 133 | 4-tert.-butylaniline | 4-methyl-2-ethyl-aniline |
| 134 | 4-isobutylaniline | 4-cyclohexylaniline |
| 135 | 2-ethoxyaniline | 4-tert.-butylaniline |
| 136 | 3-methoxyaniline | 2-, 3- or 4-isooctyl-aniline (mixture) |
| 137 | 4-isobutoxyaniline | 2-isopropylaniline |
| 138 | 2,4-dimethoxyaniline | 4-tert.-butylaniline |
| 139 | 2,5-dimethoxyaniline | 3-isoamyloxyaniline |
| 140 | 4-isobutoxycarbonylaniline | 4-isopropylaniline |
| 141 | 3-diethylacetoxyaniline | 4-tert.-butylaniline |
| 142 | 4-cyanoaniline | 3-isoamyloxyaniline |
| 143 | 3-trifluoromethylaniline | 2-, 3- or 4-isohexyl-aniline (mixture) |
| 144 | 4-isobutylaminosulphonyl-aniline | 2-methyl-4-n-butyl-aniline |
| 145 | 3-ethylsulphonylamino-aniline | 3-isoamyloxyaniline |
| 146 | 4-acetylaniline | 4-isobutylaniline |
| 147 | 3-methoxycarbonyloxy-aniline | 4-isobutylaniline |
| 148 | 3-isobutoxyaniline | 2-ethoxyaniline |
| 149 | 3-dipropylaminosulphonyl-aniline | 4-isobutylaniline |
| 150 | 3-isoamyloxyaniline | 2-ethoxycarbonyl-aniline |

We claim:

1. Process for the continuous dyeing of synthetic fiber material comprising the steps of
   A. impregnating the fiber material with a non-aqueous dyeing liquor consisting essentially of a water-immiscible organic solvent and a nitro dyestuff, said water-immiscible organic solvent consisting of aliphatic halohydrocarbon; said nitro dyestuff having the formula

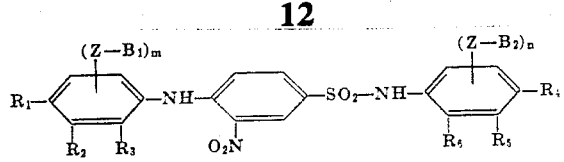

in which 4–6 members of $R_1$-$R_6$ are hydrogen and 0–2 members of $R_1$-$R_6$ independently of one another are fluorine; chlorine, bromine; hydroxy; $C_1$-$C_6$-alkoxy; $C_1$-$C_6$-alkoxycarbonyloxy $C_1$-$C_6$-alkylcarbonyloxy; phenylcarbonyloxy; phenylcarbonyloxy substituted by halogen or lower alkoxy; phenoxycarbonyloxy; phenoxycarbonyloxy substituted by halogen or lower alkoxy; nitro; cyano; phenoxy; $C_1$-$C_4$-alkanoylamino; methanesulfonylamino; aminocarbonyl; aminosulfonyl; $C_1$-$C_3$-alkanoyl; methanesulfonyl; $C_1$-$C_6$-alkoxycarbonyl; phenoxycarbonyl; phenoxycarbonyl substituted by halogen or lower alkoxy; or trifluoromethyl;

Z is a single C—C bond or —O—;

m and n are numbers from 0–3; and $B_1$ and $B_2$ are $C_1$-$C_9$-alkyl, cyclohexyl, methylcyclohexyl, benzyl, or α-α-dimethylbenzyl;

further in which the sum of the carbon atoms contained in $B_1$ and $B_2$ is 3 to 10; and the sum of n and m is at least 1; and B. subjecting the fiber material to a heat-treatment to fix said nitro dyestuff on the fiber material.

2. The process of claim 1 in which said nitro dyestuff has the formula

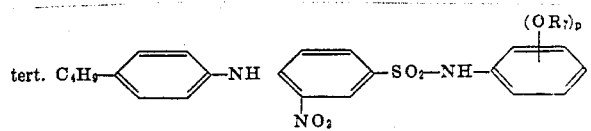

or

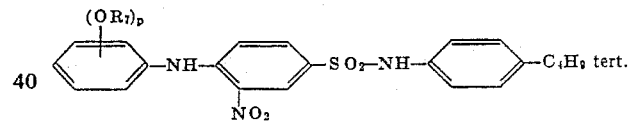

in which $R_7$ is methyl or ethyl; and p is a number from 0 to 1.

3. The process of claim 1 in which a mixture of said dyestuffs is used.

4. The process of claim 1 in which said nitro dyestuff is

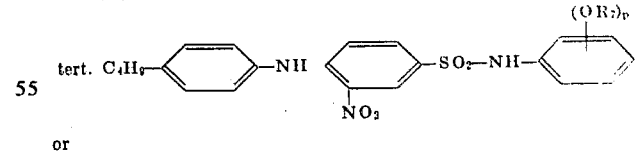

or

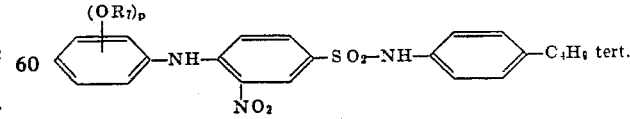

wherein $R_7$ is methyl or ethyl; and p is a number from 0 to 1.

5. The process of claim 1 in which a mixture of said nitro dyestuff is used.

6. The process of claim 1 in which said nitro dyestuff is soluble in said water-immiscible organic solvent.

7. The process of claim 1 in which the dyed material is subjected to a subsequent step of (C) rinsing with water-immiscible organic solvent in which said nitro dyestuff is soluble.

8. The process of claim 1 in which said waterimmiscible organic solvent is an aliphatic chlorohydrocarbon having a boiling point of between 40° and 150°C.

9. The process of claim 1 in which said water-immiscible organic solvent is selected from the group consisting of tetrachloroethylene, trichloroethylene, 1,1,1-trichloroethane, 1,1,1-trichloropropane and mixtures thereof.

10. The process of claim 1 in which said synthetic fiber material is cellulose triacetate, polyamide, polyurethane, polyester or poly-propylene.

11. The process of claim 1 in which said fiber material is polyester.

* * * * *

UNITED STATES PATENT OFFICE
CERTIFICATE OF CORRECTION

Patent No. 3,753,644          Dated August 21, 1973

Inventor(s) Rutger Neeff, et al

It is certified that error appears in the above-identified patent and that said Letters Patent are hereby corrected as shown below:

Column 4, line 48, "$\lambda^0 C$" should read --- 80° C. ---.

Column 6, Ex. 8, "184-" should read --- 4- ---.

Column 6, Ex. 11, "184-" should read --- 4- ---.

Column 6, Ex. 12, "184-" should read --- 4- ---.

Column 6, Ex. 14, "184-" should read --- 4- ---.

Column 6, Ex. 18, "184-" should read --- 4- ---.

Column 6, Ex. 19, "184-" should read --- 4- ---.

Column 6, Ex. 21, "184-" should read --- 4- ---.

Column 6, Ex. 22, "184-" should read --- 4- ---.

Column 6, Ex. 23, "184-" should read --- 4- ---.

Column 6, Ex. 26, "184-" should read --- 4- ---.

Column 7, Ex. 27, "184-" should read --- 4- ---.

Column 7, Ex. 30, "184-" should read --- 4- ---.

Column 7, Ex. 31, "184-" should read --- 4- ---.

Column 7, Ex. 32, "184-" should read --- 4- ---.

Column 7, Ex. 32, "(4-7/8-" should read --- (4-B- ---.

UNITED STATES PATENT OFFICE
CERTIFICATE OF CORRECTION

Patent No. 3,753,644   Dated August 21, 1973

Inventor(s) Rutger Neeff, et al   Page - 2

It is certified that error appears in the above-identified patent and that said Letters Patent are hereby corrected as shown below:

Column 7, Ex. 33, "184-" should read --- 4- ---.

Column 7, Ex. 33, "(3tri" should read ---(3-tri ---.

Column 7, Ex. 33, "(44-iso" should read ---(4-iso ---.

Column 7, Ex. 34, "184-" should read --- 4- ---.

Column 7, Ex. 34, "(4p-" should read --- (4-p- ---.

Column 7, Ex. 34, "sulphonicacid" should read --- sulphonic acid ---.

Column 7, Ex. 36, "184-" should read --- 4- ---.

Column 7, Ex. 38, "184-" should read --- 4- ---.

Column 7, Ex. 39, "184-" should read --- 4- ---.

Column 7, Ex. 40, "184-" should read --- 4- ---.

Column 7, Ex. 41, "184-" should read --- 4- ---.

Column 7, Ex. 42, "184-" should read --- 4- ---.

Column 7, Ex. 44, "184-" should read --- 4- ---.

Column 7, Ex. 45, "184-" should read --- 4- ---.

Column 7, Ex. 46, "184-" should read --- 4- ---.

Column 7, Ex. 47, "184-" should read --- 4- ---.

UNITED STATES PATENT OFFICE
CERTIFICATE OF CORRECTION

Patent No. 3,753,644     Dated August 21, 1973

Inventor(s) Rutger Neeff, et al     Page - 3

It is certified that error appears in the above-identified patent and that said Letters Patent are hereby corrected as shown below:

Column 7, Ex. 48, "184-" should read --- 4- ---.

Column 8, Ex. 59, "184-" should read --- 4- ---.

Column 8, Ex. 63, "184-" should read --- 4- ---.

Column 8, Ex. 64, "184-" should read --- 4- ---.

Column 8, Ex. 71, "184-" should read --- 4- ---.

Column 8, Ex. 72, "184-" should read --- 4- ---.

Column 8, Ex. 73, "184-" should read --- 4- ---.

Column 8, Ex. 74, "184-" should read --- 4- ---.

Column 8, Ex. 75, "184-" should read --- 4- ---.

Column 9, Ex. 81, "184-" should read --- 4- ---.

Column 9, the first example 85, should read ---84---.

Column 9, Ex. 90, "184-" should read --- 4- ---.

Column 9, Ex. 91, "184-" should read --- 4- ---.

Column 9, Ex. 93, "184-" should read --- 4- ---.

Column 9, Ex. 94, "184-" should read --- 4- ---.

Column 9, Ex. 96, "184-" should read --- 4- ---.

UNITED STATES PATENT OFFICE
CERTIFICATE OF CORRECTION

Patent No. 3,753,644          Dated August 21, 1973

Inventor(s) Rutger Neeff, et al          Page - 4

It is certified that error appears in the above-identified patent and that said Letters Patent are hereby corrected as shown below:

Column 12, Claim 4, line 53,

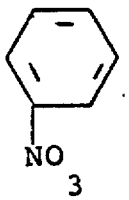

should read

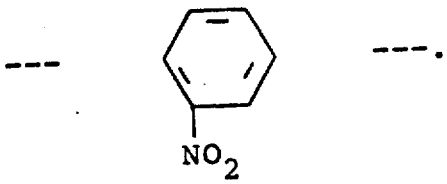

Column 13, Claim 8, lines 9 and 10, "waterimmiscible" should read ---water-immiscible---.

Signed and sealed this 18th day of February 1975.

(SEAL)
Attest:

RUTH C. MASON
Attesting Officer

C. MARSHALL DANN
Commissioner of Patents
and Trademarks